United States Patent
Melrose et al.

(10) Patent No.: US 6,549,362 B1
(45) Date of Patent: Apr. 15, 2003

(54) METHOD AND APPARATUS FOR THE ENHANCEMENT OF EMBEDDED RUNOUT CORRECTION IN A DISK DRIVE

(75) Inventors: Thomas Melrose, Longmont, CO (US); Andy Ottele, Arvada, CO (US); Jim Hargarten, Lafayette, CO (US); Dave Finamore, Louisville, CO (US)

(73) Assignee: Maxtor Corporation, Longmont, CO (US)

( * ) Notice: Subject to any disclaimer, the term of this patent is extended or adjusted under 35 U.S.C. 154(b) by 255 days.

(21) Appl. No.: 09/753,969

(22) Filed: Jan. 2, 2001

Related U.S. Application Data
(60) Provisional application No. 60/210,712, filed on Jun. 9, 2000.

(51) Int. Cl.$^7$ .............................................. G11B 5/596
(52) U.S. Cl. ................................ 360/77.04; 360/77.08
(58) Field of Search ........................... 360/77.04, 77.08, 360/77.11, 77.02, 75, 78.09

(56) References Cited

U.S. PATENT DOCUMENTS

| | | | |
|---|---|---|---|
| 4,412,165 A | 10/1983 | Case et al. .................. 318/636 |
| 5,270,885 A | 12/1993 | Satoh et al. ............ 360/77.04 |
| 5,404,253 A | 4/1995 | Painter .................... 360/77.04 |
| 5,608,586 A | 3/1997 | Sri-Jayantha et al. .... 360/77.04 |
| 5,822,147 A | 10/1998 | Kisaka .................... 360/77.08 |
| 5,825,578 A | 10/1998 | Shrinkle et al. ......... 360/77.08 |
| 5,854,722 A | 12/1998 | Cunningham et al. ... 360/77.04 |
| 5,886,846 A | 3/1999 | Pham et al. ............. 360/78.04 |
| 5,926,338 A | 7/1999 | Jeon et al. ............... 360/77.04 |
| 6,061,200 A * | 5/2000 | Shepherd et al. ........ 360/77.04 |
| 6,069,764 A | 5/2000 | Morris et al. ............ 360/77.04 |
| 6,115,203 A | 9/2000 | Ho et al. ................. 360/77.04 |
| 6,292,324 B1 * | 9/2001 | Ho et al. ................. 360/77.04 |

* cited by examiner

Primary Examiner—Andrew L. Sniezek
(74) Attorney, Agent, or Firm—Taipal S. Hansra

(57) ABSTRACT

A method and apparatus for the enhancement of embedded runout correction in a disk drive is provided. According to the present invention, embedded runout correction values are obtained by convolving a position error signal due to repeatable runout for a track with an inverse impulse response describing the response of a transducer head servo system to a given input. According to the present invention, the inverse impulse response is determined by introducing an impulse to a transducer head servo system, and measuring the response of the system in the time domain. The response is transformed to the frequency domain to form an error transfer function, the reciprocal is taken, and the function is transformed back into the time domain. The inverse impulse response, according to the present invention, is obtained for at least every transducer head in a disk drive capable of addressing a track for which embedded runout correction is desired. The embedded runout correction values may be calculated without the use of a servo track writer.

26 Claims, 5 Drawing Sheets

METHOD AND APPARATUS FOR THE ENHANCEMENT OF EMBEDDED RUNOUT CORRECTION IN A DISK DRIVE

CROSS REFERENCE TO RELATED APPLICATIONS

Priority is claimed from U.S. Provisional Patent Application Serial No. 60/210,712, filed Jun. 9, 2000 entitled "ENHANCED EMBEDDED RUNOUT CORRECTION", which is incorporated herein by reference in its entirety.

FIELD OF THE INVENTION

The invention relates in general to transducer positioning in a magnetic data storage system and, more particularly, to compensation for repetitive run-out (RRO) created by a servo track writer (STW) in a magnetic data storage system.

BACKGROUND OF THE INVENTION

A disk drive is a data storage device that stores digital data in tracks on the surface of a data storage disk. Data is read from or written to a track of the disk using a transducer that is held close to the track while the disk spins about its center at a substantially constant angular velocity. To properly locate the transducer near the desired track during a read or write operation, a closed-loop servo scheme is generally implemented that uses servo data read from the disk surface to align the transducer with the desired track. The servo data is generally written to the disk using a servo track writer (STW).

In an ideal disk drive system, the tracks of the data storage disk are non-perturbed circles situated about the center of the disk. As such, each of these ideal tracks includes a track centerline that is located at a known constant radius from the disk center. In an actual system, however, it is difficult to write non-perturbed circular tracks to the data storage disk. That is, problems, such as vibration, bearing defects, inaccuracies in the STW and disk clamp slippage can result in tracks that are written differently from the ideal non-perturbed circular track shape. Positioning errors created by the perturbed nature of these tracks are known as written-in repetitive runout (STW_RRO). The perturbed shape of these tracks complicates the transducer positioning function during read and write operations because the servo system needs to continuously reposition the transducer during track following to keep up with the constantly changing radius of the track centerline with respect to the center of the spinning disk. Furthermore, the perturbed shape of the these tracks can result in problems such as track squeeze and track misregistration errors during read and write operations.

In certain conventional systems, as will be understood by those skilled in the art, the STW is used to directly measure the STW_RRO for each track of a disk so that compensation values may be generated and used to position the transducer along an ideal track centerline. In such systems, the STW must measure the STW_RRO of each track of a disk one track at a time. Because (1) a typical disk drive has two or more disks (or four or more disk surfaces), (2) a typical disk contains over 20,000 tracks per inch (TPI), and (3) typical disk rotation speeds are around 7200 revolutions per minute (RPM), the STW could be busy for several hours in measuring the STW_RRO for one disk drive. The values of the STW_RRO for each track (or section of track) are then stored on the disk for use during transducer positioning. For an example of a disk drive system that is similar to the above described system, reference is made to U.S. Pat. No. 4,412,165 to Case et al. entitled "Sampled Servo Position Control System," which is incorporated herein by reference.

As is well-known in the art, STW's are very expensive and, therefore, only a limited number of STW's are available at a disk drive manufacturing facility. Accordingly, if the STW's are tied up for extended periods of time in measuring the STW_RRO for each disk drive, the manufacturing throughput and efficiency of a manufacturing facility will be dramatically decreased.

In certain other conventional systems, as will be understood by those skilled in the art, the STW_RRO can be obtained if the error transfer function that describes the reaction of the servo control system to an input is known. In particular, the STW_RRO values can be determined by convolving the position error of the transducer head due to repeatable runout (PES_RRO) with the inverse impulse response. According to this conventional system, the error transfer function is determined from measured frequency response data or by computer modeling. In the case of using measured frequency response data, a discrete rational non-minimum phase polynomial transfer function is obtained by performing a least squares fit of the measured frequency data. For a model-based system, the error transfer function is directly calculated. The inverse error transfer function is determined by swapping the numerator and denominator of the discrete rational non-minimum phase polynomial error transfer function. Using the Z-transform, the non-causal impulse response is obtained from the inverse error transfer function. The STW_RRO values can then be determined by convolving measured PES_RRO values with the non-causal impulse response. Such a system is disclosed in U.S. Pat. No. 6,115,203, issued Sep. 5, 2000. the disclosure of which is incorporated herein by reference, and which is assigned to the assignee of the present invention.

However, the model-based non-causal impulse response obtained by the above-described system is inaccurate. In addition, the process of fitting a linear least squares finite order model to measured frequency response data introduces errors that carry through the calculations. Furthermore, the modeling of this transfer function is performed in non-real time. Accordingly, it is impractical to develop a non-causal impulse response of the inverse transfer function for an individual disk drive. Because of these limitations, the method of determining a non-causal impulse response from measured frequency data is not completely effective at canceling repeatable runout in a hard disk drive.

Therefore, it would be advantageous if a system were provided to compensate for STW_RRO without requiring the use of a STW to determine the STW_RRO. In addition, it would be advantageous if a system were provided to compensate for STW_RRO in a drive by utilizing that drive's actual impulse response. Furthermore, it would be advantageous to provide a system that could be implemented in a high volume production environment.

SUMMARY OF THE INVENTION

The invention relates to a disk drive transducer positioning system and method for implementing the same that is capable of canceling written-in repetitive runout in substantially real time. Using the system, the transducer of the disk drive will follow a substantially non-perturbed circular path over the disk even though the written track is perturbed as compared with an ideal track. The system provides a significant improvement in at least track misregistration, write fault performance and seek settling time over disk drives that do not include the system. Furthermore, the present invention improves the efficiency of disk drive manufacturing facilities. The system is of particular benefit in disk drives having a relatively high track density.

In accordance with the invention, a disk drive system is disclosed. In one embodiment, the disk drive system comprises a data storage disk having one or more tracks. Each of the tracks have an ideal shape and an actual written shape. The disk drive further includes a means for estimating the actual written shape of the track. The means used does not include a STW. Rather, the means uses the disk drive containing the data storage disk.

In accordance with one embodiment of the present invention, a method and apparatus are provided in which embedded runout correction values are obtained by convolving PES_RRO values with the inverse impulse response of the servo system of the disk drive. In particular, according to the method and apparatus of the present invention, the inverse error impulse response for each transducer head in a hard disk drive is determined from a measurement of the impulse response to each transducer head. Accordingly, the method and an apparatus of the present invention provide a numerical impulse response function for a particular transducer head in a particular hard disk drive.

According to an embodiment of the present invention, the inverse impulse response is determined by measuring (in the time domain) the response of a servo control system associated with a transducer head to an impulse signal or function written to a track on the disk or otherwise provided to the servo control system. The error transfer function may then be obtained by transforming the measured impulse response to the frequency domain. According to one embodiment of the present invention, the transformation of the impulse response of the transducer head is performed using a Discrete Fourier Transform. The reciprocal of the resulting error transfer function may then be taken. The reciprocal error transfer function response may then be transformed back into the time domain to obtain the inverse impulse response of the servo system for the transducer head. According to one embodiment of the present invention, the transformation to the time domain is accomplished by using an inverse Discrete Fourier Transform. The runout correction values for a track are then calculated by convolving the position error due to repeatable runout with the inverse impulse response for the transducer head. According to another embodiment of the present invention, an inverse impulse response of a transducer head is obtained by introducing an impulse to the transducer head from a track located towards an outer diameter of the disk surface addressed by the transducer head.

According to a further embodiment of the present invention, an inverse impulse response is determined for each transducer head in a hard disk drive. According to still a further embodiment of the present invention, a PES_RRO is determined for each track on a disk surface for which correction of repeatable runout is desired. According to yet another embodiment of the present invention. an inverse impulse response of a transducer head is determined with respect to each track for which correction of repeatable runout is desired.

Based on the foregoing summary, a number of salient features of the present invention are readily discerned. A method for determining the inverse impulse response of a transducer head in a hard disk drive is provided. The method enables the generation of runout correction values, without requiring the use of a servo track writer to generate those values. In addition, the method provides an inverse impulse response that is particular to the transducer head for which it is derived, and that can be calculated using the controller of the hard disk drive. Furthermore, the present invention provides a hard disk drive having embedded runout correction values that are calculated using an inverse impulse response that is particular to a transducer head in a hard disk drive. The method and the apparatus of the present invention provide improved embedded runout correction, which allows a transducer head to more nearly follow the ideal shape of a track, even though the track has an actual written shape that is not ideal.

Additional advantages of the present invention will become readily apparent from the following discussion, particularly when taken together with the following drawings.

DETAILED DESCRIPTION

Figure 1:
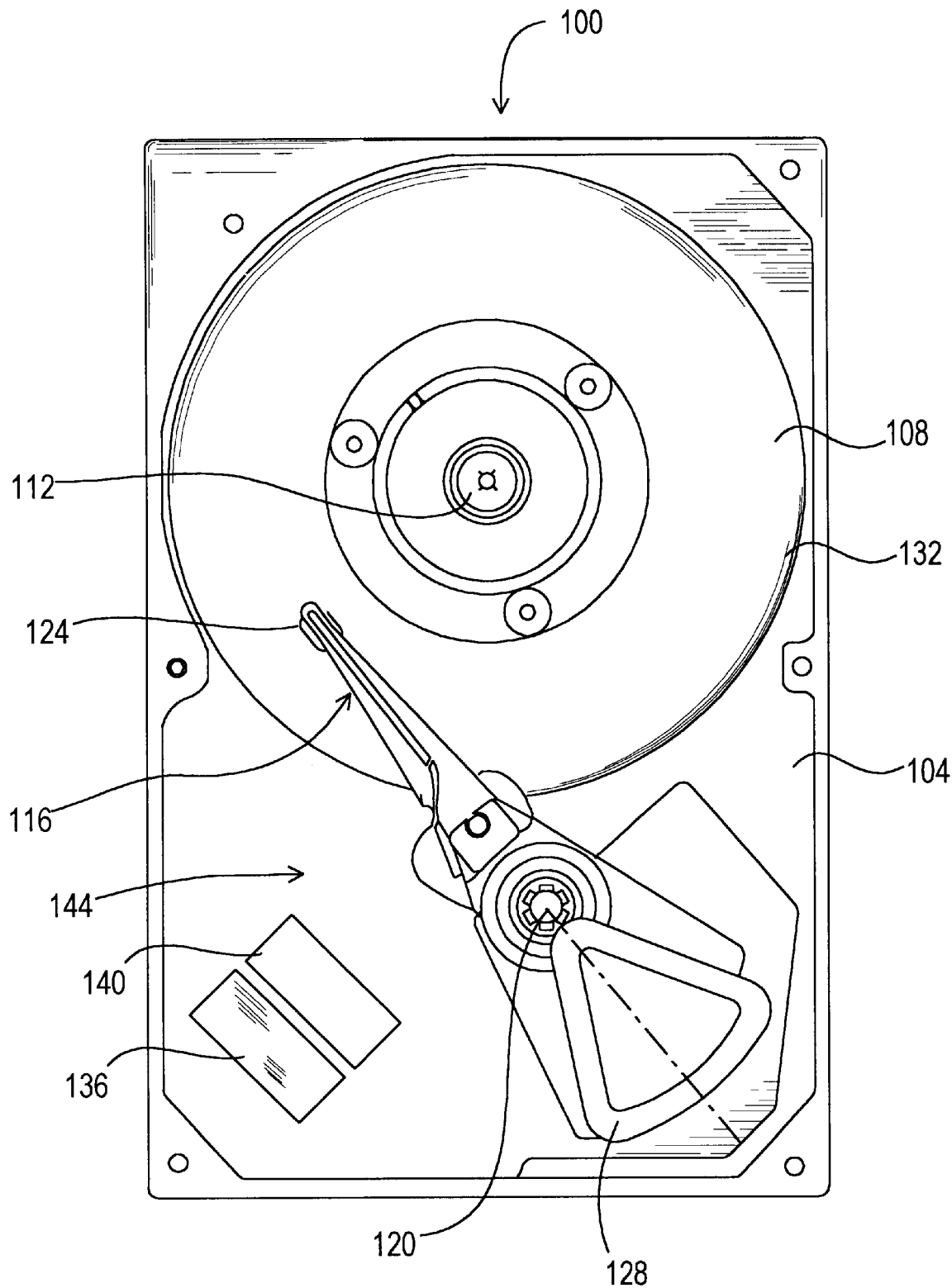
FIG. 1 is a diagrammatic representation of a top view of a hard disk drive, with the cover removed.

FIG. 1 illustrates a typical computer disk drive. The disk drive, generally identified by reference number 100, includes a base 104 and magnetic disks 108 (only one of which is shown in FIG. 1). The magnetic disks 108 are interconnected to the base 104 by a spindle motor (not shown) mounted within or beneath the hub 112, such that the disks 108 can be rotated relative to the base 104. Actuator arm assemblies 116 (only one of which is shown in FIG. 1) are interconnected to the base 104 by a bearing 120. The actuator arm assemblies 116 each include a transducer head 124 at a first end, to address each of the surfaces of the magnetic disks 108. A voice coil motor 128 pivots the actuator arm assemblies 116 about the bearing 120 to radially position the transducer heads 124 with respect to the magnetic disks 108. By changing the radial position of the transducer heads 124 with respect to the magnetic disks 108, the transducer heads 124 can access different data tracks or cylinders 132 on the magnetic disks 108. The voice coil motor 128 is operated by a controller 136 that is in turn operatively connected to a host computer (not shown). A channel 140 processes information read from the magnetic disks 108 by the transducer heads 124.

Figure 2:
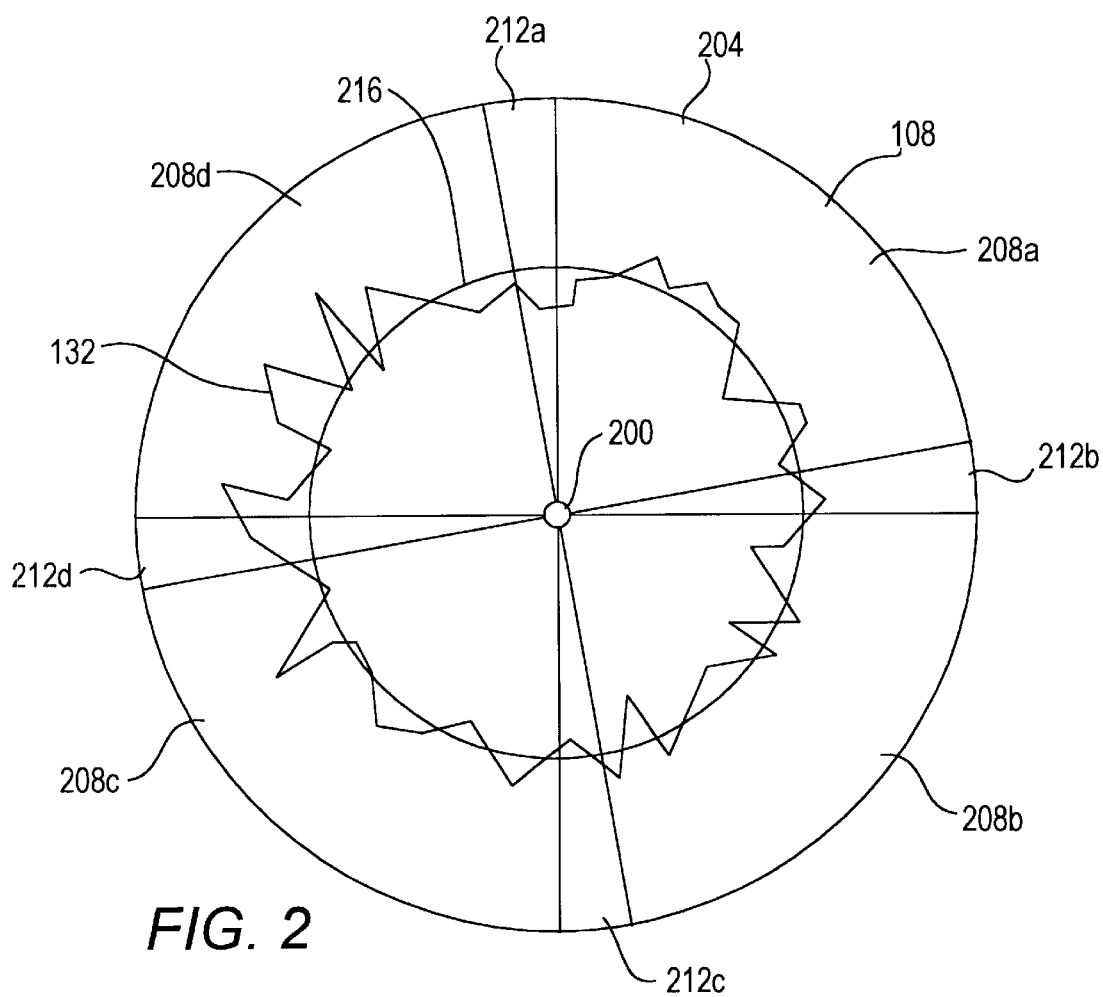
FIG. 2 is a diagrammatic representation of a magnetic storage disk having a perturbed data track that can be compensated for in accordance with the present invention.

As illustrated in FIG. 2, the disk 108 is substantially circular in shape and includes a center point 200 located in the center of the disk 108. The disk 108 also includes a plurality of tracks 132 (only one of which is illustrated in FIG. 2) on an upper surface 204 of the disk 108 for storing the digital data. The data tracks 132 are divided into data fields 208a–208d and servo sectors or hard sectors 212a–212d. Generally, the data fields 208a–208d are used for storing data as a series of magnetic transitions, while the servo sectors 212a–212d are used for storing servo information, also as a series of magnetic transitions, that is used to provide the transducer head 124 with positioning information. In particular, the servo sectors 212a–212d provide the transducer heads 124 with information concerning their position over the magnetic disk 108. More particularly, the servo sectors 212a–212d provide information to the transducer heads 124 concerning the identity of the track 132 and servo sector 212 over which each transducer head 124 is flying, and concerning the position of each transducer head with respect to the centerline of the track 132.

Although the magnetic disk 108 illustrated in FIG. 2 is illustrated as having a relatively small number of data tracks 132 and servo sectors 212, it can be appreciated that a typical computer disk drive contains a very large number of data tracks 132 and servo sectors 212. For example, computer disk drives having over 35,000 tracks per inch and 240 sectors are presently available.

The disk drive 100 includes a servo control system 144 for controlling the position of a transducer head 124 with respect to a track 132 being followed. In general, the servo control system comprises the transducer head 124 being positioned, which reads the position error information from the servo sectors 212; the actuator arm assembly 116 that is carrying the transducer head 124; the voice coil motor 128; the channel 140; and the controller 136. As will be described in greater detail below, the response of the servo control system 144 to a given input is given by the error transfer function of the servo control system 144.

The track 132 is ideally non-perturbed and ideally shares a common center 200 with the disk 108, such as ideal track 216 illustrated in FIG. 2. Due to system imperfections, however, the actual written track 132 can be perturbed as compared to an ideal track 216 such as non-ideal track 132 as illustrated in FIG. 2. A perturbed or non-ideal track 132 is difficult for a transducer head 124 to follow, because the position of the transducer head 124 must constantly be adjusted by the servo control system. Consequently, the positioning of the transducer head 124 is not as accurate on the written track 132 as it would be on an ideal track 216. The present invention provides a system that allows a transducer head 124 to more closely follow the path of an ideal track, such as the path of track 216, using the servo information written in a non-ideal track, such as track 132. The system of the present invention therefore approximates a system having an almost perfect servo track written disk.

As mentioned above, the tracks 132 on the disk 108 are each divided into a plurality of data fields 208 and servo sectors or hard sectors 212. The servo sectors 212 include, among other things, information for use by the disk drive 100 in locating a transducer head 124 above a desired track 132 of the disk 108. When a host computer requests that data be read from or written to a particular track 132 and data field 208 of the disk 108, the transducer head 124 must be moved to the track 132 and then must be positioned at a predetermined location relative to the centerline of the track 132 before data transfer can take place. For purposes of illustrating the present invention, it will be assumed that the transducer should be placed on the track centerline in order to read from and write to the disk. It should be understood that the invention is not limited to solely reading and writing when the transducer is placed at the track centerline. As noted above, the present invention allows a transducer head to follow the ideal representation (ideal track 216) of a track 132 that is perturbed as written to the disk 108.

The disk drive 100 uses the information stored in the servo sector 212 portions of the tracks 132 to first locate the desired track and to then appropriately position the transducer head 124 with respect to the centerline of the desired track. The user data fields 208 include data that can be accessed by an external host computer for use in connection with a central processing unit (CPU) located therein. In general, the number of sectors 212 per track 132 on the disk 108 is a matter of design choice. The number may be dictated by, for example, a required servo update rate for the disk drive.

Figure 3:
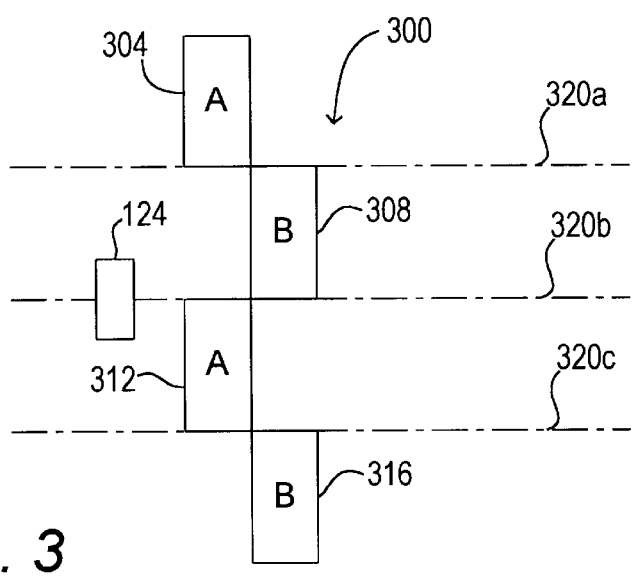
FIG. 3 is a diagrammatic representation of a servo burst pattern that may be used to position a transducer head with respect to a track centerline.

FIG. 3 illustrates a typical servo pattern 300 stored within the servo portion of a servo sector 212 for use in centering a transducer head 124 on a desired track 132. The servo pattern 300 includes a plurality of servo bursts 304, 308, 312 and 316 that define the centerlines 320a–c of the tracks 132 of the disk 108. The bursts 304, 308, 312 and 316 are divided into A bursts 304, 312 and B bursts 308, 316 that are each approximately (but are not limited to) a track-width wide and that alternate across the disk surface. The boundary between an A burst and an adjacent B burst (e.g., A burst 312 and B burst 308) defines the centerline (e.g., centerline 320b) of a track 132 on the disk 108. To center the transducer head 124 using the A and B bursts, the transducer head 124 is first moved to the desired track 132 during a seek operation and, once there, is allowed to read the A and B bursts on the desired track 132. The signal magnitudes resulting from reading the A and B bursts are then combined (such as by subtracting the B burst magnitude from the A burst magnitude) to achieve an error signal, known as the position error signal (PES). The PES indicates the distance between the center of the transducer head 124 and the centerline (e.g. centerline 320b) of the desired track. The PES signal is used by the disk drive 100 to change the position of the transducer head 124 to one that is closer to the desired (centered) position. This centering process is repeated for each successive sector on the track until the requested read/write operation has been performed in the appropriate data field 208 of the disk 108. It should be appreciated that other schemes for storing servo information on the magnetic media, such as schemes having A, B, C and D position bursts; using zones; constant linear density (CLD) recording, split data fields; and/or hybrid servo, can also be used in accordance with the present invention.

The A 304, 312 and B 308, 316 bursts, as well as other servo information, are written to the surface 204 of the disk 108 using a servo track writer (STW) after the disk 108 is assembled into the disk drive 100 during the manufacturing process. It is these A and B bursts which define the location of the written tracks on the disk 108. That is, on a non-ideal track (such as track 132 of FIG. 2) the A and B bursts are written such that the centerline of the track 132 does not describe a perfect circle, but rather is perturbed. However, the transducer head 124 can be made to follow the path of an ideal track 216 by adding an appropriate offset or runout correction value to the PES signal in each of the servo sectors 212 of a particular track 132. As illustrated in FIG. 2, the offset amount between the centerline of the non-ideal track 132 and the path of the ideal track 216 is different in each servo sector 212a–d of the track. In one aspect of the present invention, a method and apparatus is provided for determining the written-in repetitive runout (STW_RRO) values. By knowing the STW_RRO of a track, offset values to modify the PES signal so that the transducer head 124 can follow the path of the ideal track 216 corresponding to the written track 132 can be calculated. The offset values may then be stored in the servo sector portions 212 of the disk 108.

The present invention uses an impulse response to calculate the STW_RRO values from measured PES values of the drive. The offset values that are used to modify the PES signal are known as embedded runout correction (ERC) values. In accordance with one embodiment of the present invention, ERC values are stored within the servo portions of each servo sector 212 of the disk 108 for use in positioning the transducer head 124 on an ideal track path 216 during track following operations. ERC values may also be stored in look-up tables maintained in the disk drive 100 or in any other suitable storage location, such as in memory included in or accessible to the disk drive 100.

Figure 4:
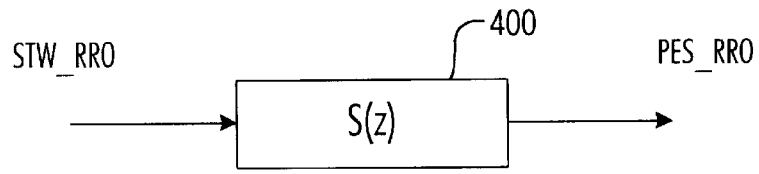
FIG. 4 is a block diagram depicting the relationship between servo track writer repetitive runout and the position error signal for a particular track.
Figure 5:
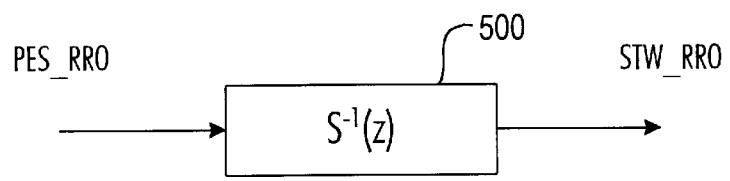
FIG. 5 is a block diagram depicting the relationship between the position error signal for a particular track and the servo track writer repetitive runout.

If the transducer head 124 is to follow a perturbed path, such as that of a non-ideal track 132 in FIG. 2, the position of the transducer head 124 must be constantly adjusted as the disk 108 rotates. Therefore, when performing conventional track following on a non-ideal track, adjustments are constantly being made to the position of the transducer head 124 to keep it centered on the track 132. The transducer position is adjusted, as described above, by deriving a PES signal from the position bursts, such as from the A 312 and B 308 bursts where centerline 320b is being followed. The PES signal is used to create a control signal for a movement means (such as a voice coil motor) to move the transducer head 124 an appropriate amount. Because the transducer head 124 position is continuously being adjusted, perfect or near perfect registration between the transducer head 124 center and the centerline of the track 132 (e.g., centerline 320b) is rarely achieved. This can create problems such as high track misregistration values. In conceiving of the present invention, it was appreciated that the PES values due to repeatable runout that are derived from the servo sectors 212 associated with a track 132 (which henceforth will be referred to as PES_RRO values) during track following are related to the STW_RRO values for the track by a predetermined transfer function S(z) 400, as illustrated in FIG. 4. The transfer function 400, in general, describes how the servo control system 144 reacts to and follows the perturbed track 132. That is, STW_RRO is the stimulus and PES_RRO is the response. As illustrated in FIG. 5, in order to determine the STW_RRO values using the measured PES_RRO values, one needs to find the inverse transfer function $S^{-1}(z)$ 500 and to apply the PES_RRO values thereto.

Figure 6:
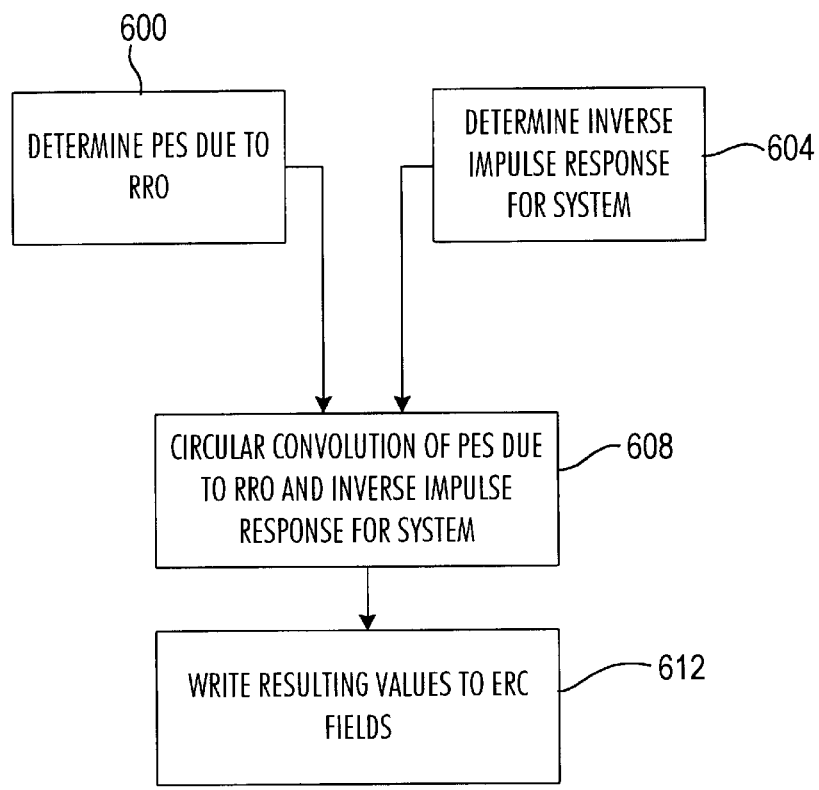
FIG. 6 is a flow chart illustrating a method for determining embedded runout correction values in accordance with an embodiment of the present invention.

With reference now to FIG. 6, the operation of a disk drive 100 in accordance with an embodiment of the present invention is illustrated. At step 600, the position error signal derived from servo sectors 212 associated with a track 132 is determined. In general, the position error due to repeatable runout (PES_RRO) for a track 132 is determined by following the track 132, and reading the position error from the servo bursts (e.g., servo bursts 308 and 312) in each servo sector 212 associated with the track 132 for multiple revolutions of the disk 108. As will be appreciated by those of ordinary skill in the art, reading the position error over multiple revolutions allows the effects of non-repeatable runout to be removed from the position error data. According to one embodiment of the present invention, position error information is taken over at least 25 revolutions of the disk 108 in generating PES_RRO data for a particular track 132 on a disk surface 204.

At step 604, the inverse impulse response for the system is determined. The method for determining the inverse impulse response of the system will be discussed in greater detail below, in part in connection with FIGS. 7–9.

Once the inverse impulse response for the system is determined, a circular convolution of the PES_RRO and the inverse impulse response for the system is performed at step 608. The result of the convolution operation is the STW_RRO (see FIG. 5). The STW_RRO value obtained for each servo sector 212 may then be written to an embedded runout correction field included as part of the data stored in the servo sectors 212 as an ERC value (step 612).

During normal operation of the disk drive 100, the transducer head 124 reads the ERC value stored in each servo sector 212 of a desired track 132. The ERC value is then used to modify the PES to cancel the offset between the non-ideal track (e.g., track 132) and the ideal track (e.g., ideal track 216). According to one embodiment of the present invention, the ERC value for a sector is subtracted from the PES value read by the transducer head 124 for that sector to obtain a modified PES value. For example, the STW_RRO at a particular sector may be 5% of the track width (i.e., the centerline of the ideal track 216 is a distance equal to 5% of the total width from the centerline of the track 132 as written) in a positive direction. Furthermore, the transducer head 124 may be off-center, such that the PES as read indicates that the transducer head 124 is a distance equal to +6% of a track width from the track 132 centerline. According to this example, the modified PES will be equal to +1%. This modified PES value is then applied in generating a control signal for operating the voice coil motor 128 to position the transducer head 124.

According to an embodiment of the present invention, an impulse response is obtained for each transducer head 124 in the disk drive 100. In general, an impulse is provided to the servo control system 144. The impulse may be written to a servo sector 212 ERC field in a track 132, or it may be injected into the PES signal derived from a servo sector 212 in a track 132. In particular, a positive impulse may be provided to the servo control system 144, and the response of the servo control system 144 is measured in the time domain. Next. a negative impulse is provided to the servo control system 144 and the response of the servo control system 144 to the negative impulse is measured in the time domain. This may be repeated for each servo sector 212 in the track 132. Each set of impulse response data may then be circularly shifted for alignment and averaged to remove repeatable run out. The result is two impulse responses, one positive and one negative. The negative response may be inverted and averaged with the positive impulse response to remove the PES_RRO from the impulse response.

Figure 7:
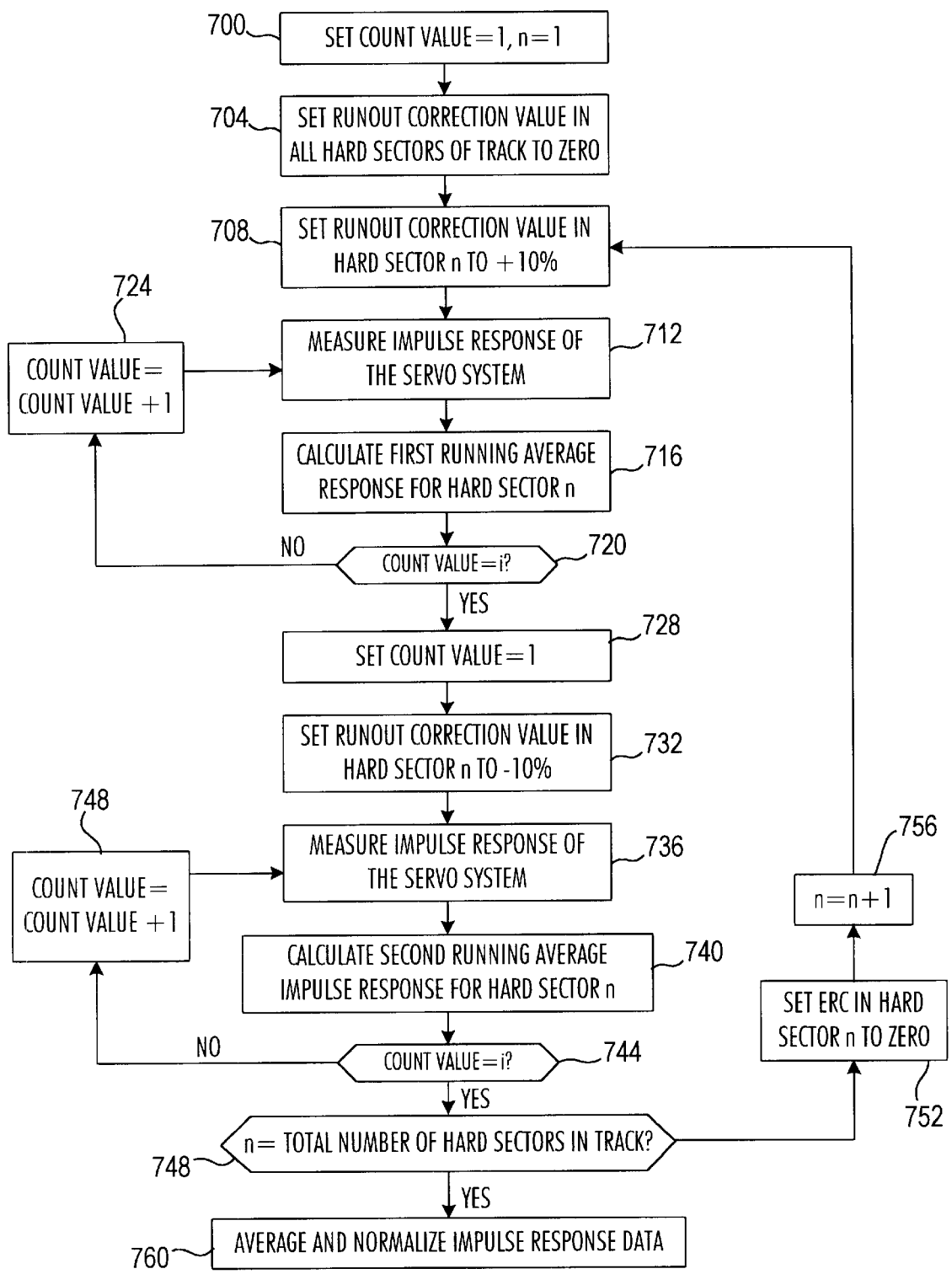
FIG. 7 is a flow chart illustrating the generation and measurement of impulse response data for a head in a hard disk drive in accordance with an embodiment of the present invention.

With reference now to FIG. 7, the generation of an impulse response for a transducer head 124 in a disk drive 100 according to one embodiment of the present invention is illustrated. Initially, at step 700, the count value and the value for n are set equal to 1. The count value is used to count the number of impulse responses that have been measured. In general, it is desirable to take multiple measurements of the impulse response to an impulse written to a servo sector in order to obtain a response that is relatively free from noise and the effects of non-repeatable runout. Accordingly, the impulse is written to a plurality of servo sectors 212 and the impulse response is measured and averaged to cancel out the repeatable runout. The value n is used to count the number of servo sectors 212 for which an impulse response has been obtained. Next, the embedded runout correction value in all of the servo sectors 212 of a track 132 is set to 0 (step 704).

At step 708, the embedded runout correction value in servo sector (or hard sector) 212 n is set to +10% of the total track width in the positive direction. This relatively large correction value appears to the servo control system 144 as an impulse function. At step 712, the response of the servo control system 144 to the impulse input is measured. At step 716, a first running average impulse response for hard sector 212 n is calculated. Next, the count value is compared to a count variable i (step 720). The count variable i is used to set the number of measurements taken of the response of the servo control system 144 to an impulse signal written to an individual servo sector 212. If the count value is less than the count variable i, the count value is incremented (step 724) and the system returns to step 712 to measure the impulse response of the servo control system 144 to the impulse input. In this way, an average impulse response of the servo control system 144 to an impulse input at a particular servo sector is obtained.

If the count value is determined to be equal to the count variable i (step 720) the system proceeds to step 728, at which point the count value is set equal to 1. Next, the runout correction value stored in hard sector n is set to −10% (step 732). It will be noted that all other embedded runout correction values associated with the track are still equal to 0. Accordingly, the relatively large correction value of 10% of the total track width in a negative direction appears to the servo control system 144 as an impulse function. The response of the servo control system 144 to this impulse input is measured at step 736. Next, a second running average impulse response for servo sector 212 n is calculated (step 740). At step 744, it is determined whether the count value is equal to i. If the count value is not equal to i, the count value is incremented (step 748) and the system returns to step 736 to measure the impulse response of the disk drive 100. If the count value is determined to be equal to i, the system proceeds to step 748. in which the value n is compared to the total number of hard sectors in the track 132. If n is less than the total number of hard sectors in the track, the embedded runout correction value in hard sector 212 n is set to 0 (step 752) and n is set equal to n+1 (step 756). The system then returns to step 708. If n is equal to the total number of hard sectors 212 in the track 132. the system proceeds to step 760, and the impulse response data for the servo control system 144 is averaged and normalized.

Figure 8:
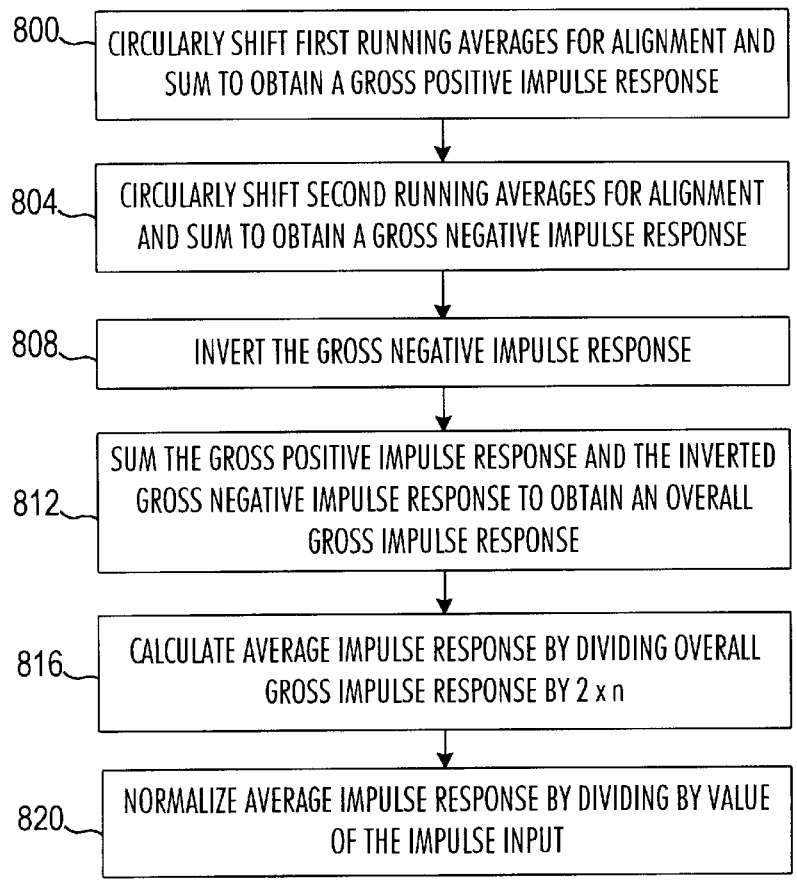
FIG. 8 is a flow chart illustrating the processing of impulse response data to obtain an impulse response for a head in a hard disk drive in accordance with an embodiment of the present invention.

The processing of impulse response data to obtain a numerical impulse response model for a transducer head 124 in a hard disk drive 100 according to one embodiment of the present invention is illustrated in FIG. 8. Initially, at step 800, the first running averages obtained at step 716 are circularly shifted for alignment and summed to obtain a gross positive impulse response. Similarly, the second running averages obtained at step 740 are circularly shifted for alignment and summed to obtain a gross negative impulse response (step 804). Next, the gross negative impulse response is inverted (step 808). The gross positive impulse response and the inverted gross negative impulse response are then summed to obtain an overall gross impulse response (step 812). The average impulse response is then obtained by dividing the overall gross impulse response by two times the number of hard sectors 212 from which average positive and negative impulse responses were obtained (e.g., the number of hard sectors 212 in the drive 100) (step 816). The average impulse response is then divided by the amplitude of the impulse signal introduced to the system to obtain a normalized impulse response (step 820).

Figure 9:
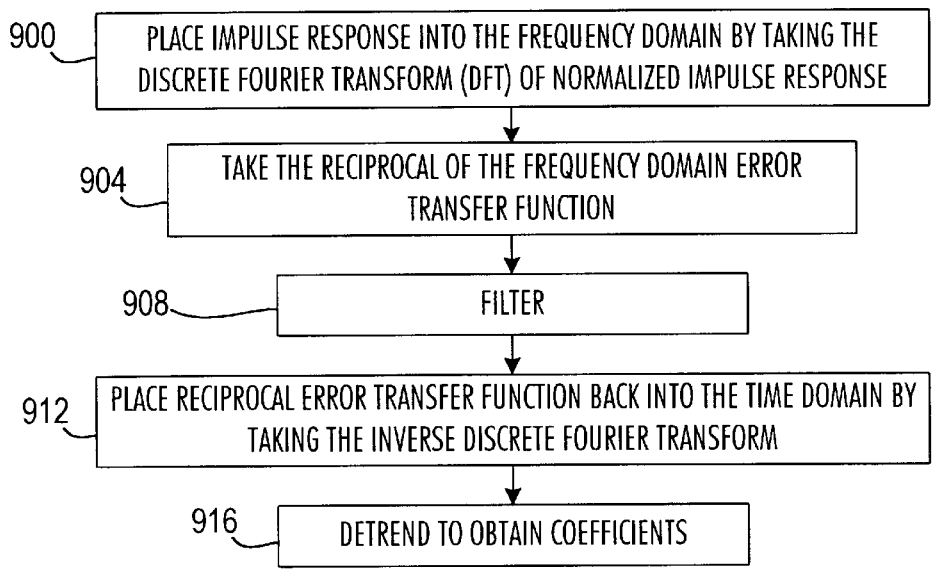
FIG. 9 is a flow chart illustrating the generation of coefficients representing the inverse impulse response of a transducer head in accordance with an embodiment of the present invention.

With reference now to FIG. 9. the generation of coefficients describing the inverse impulse response of the servo control system 144 according to one embodiment of the present invention is illustrated. Initially, at step 900, the normalized impulse response (which is in the time domain) is placed into the frequency domain by taking the Discrete Fourier Transform (DFT) of the response, to obtain the error transfer function. Next, the reciprocal of the error transfer function is taken (step 904). At step 908, the reciprocal frequency domain response (i.e. the reciprocal error transfer function) is filtered. At step 912, the reciprocal error transfer function of the system is placed into the time domain by taking the inverse DFT of that function, to obtain the reciprocal or inverse error impulse response. Finally, at step 916, the time domain reciprocal error impulse response is detrended. In this way, coefficients describing the inverse impulse response of a servo control system 144 are obtained. Although not strictly necessary to the performance of the present invention, it is desirable to filter and detrend the error transfer function and/or the impulse response in order to remove the DC components of the response and to remove certain frequency components, such as the 1f frequency component, of the response, and to zero the first term of the Discrete Fourier Transform. These DC components and selected frequency components may be compensated for by other mechanisms or systems included in the disk drive 100.

It will be appreciated that the steps illustrated in FIGS. 7, 8 and 9 should be taken for each transducer head 124 in a disk drive 100 for which embedded runout correction is desired. Furthermore, it will be appreciated that the most accurate embedded runout correction values for a particular track 132 may be obtained by convolving the PES_RRO for that track with an inverse impulse response obtained by measuring the response of the servo control system 144 including the particular transducer head 124 that addresses the track 132 in response to impulse inputs provided to the servo control system 144 while that track 132 is being followed. However, the inventors have found that useful correction of written-in runout (STW_RRO) can be obtained for all or most tracks 132 on a disk surface 204 by measuring the impulse response of a transducer head 124 to impulse inputs written to just one track towards an outside of that disk surface. The inverse impulse response obtained for that one track can then be convolved with the PES_RRO values for additional tracks 132 on that disk surface to obtain correction values that can be embedded in the hard sectors 212 associated with those tracks 132 for which PES_RRO values have been obtained.

The inventors have further found that tracks 132 located towards the outer diameter of a disk 108 are more likely to require embedded runout correction to ensure adequate performance of the disk drive 100 than are tracks 132 located towards an inner diameter of the disk 108. Accordingly, if an impulse response is to be derived from impulse inputs written to a single track 132 on a disk 108, it is advantageous to choose a track 132 located towards an outer diameter of the disk 108. The inverse impulse response obtained from the single track 132 can then be convolved with PES_RRO data from other tracks requiring runout correction to obtain ERC values for each of the other tracks. According to still another embodiment of the present invention, the tracks 132 on a disk 108 may be divided into a series of zones, and one or more tracks 132 from each of the zones may be used to obtain impulse response data. PES_RRO data from tracks requiring correction and located in a first of the zones may then be convolved with the inverse impulse response determined by inputting an impulse function to the servo system from a one of the tracks in the first zone to obtain ERC values.

The present invention may be implemented in the firmware of the controller 136 and/or channel 140 of the disk drive 100, or any other convenient place in the disk drive. In addition, the present invention may be implemented in a computer external to the disk drive 100. It also will be appreciated that the described steps of determining an impulse response for a track or plurality of tracks on a surface, and of determining a PES_RRO for tracks requiring correction to obtain ERC values can be accomplished without the use of a STW. Furthermore, it will be appreciated that the described steps for obtaining ERC values can be performed automatically by the disk drive 100, during or following manufacture of the disk drive 100.

In a preferred embodiment of the present invention, the impulse input is provided by writing an impulse value to memory in the disk drive 100, rather than writing the value to hard sectors 212 on the disk 108. The impulse value may then be injected into the PES signal for each hard sector 212 in a track 132. This embodiment of the present invention achieves the effect of writing an impulse value to the disk 108 itself. This embodiment is advantageous in that there is no need to delete the impulse value from the disk 108 before the impulse value is written to a next hard sector.

According to the present invention, a method is disclosed for calculating embedded runout correction values in a computer hard disk drive. According to the method, the position error signal read by a transducer head as a result of repeatable runout is convolved with the inverse of the impulse response describing the response of the transducer head servo control system to a given input. The inverse impulse response is, according to the present invention, obtained by injecting or otherwise providing an impulse function into a transducer head servo system and measuring the response of the transducer head servo control system. The present invention further provides a hard disk drive having embedded runout correction values. The embedded runout values are calculated by convolving the position error due to repeatable runout with the inverse impulse response of a transducer head servo system, and the impulse response is obtained by introducing an impulse signal to the transducer head servo system.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method of calculating repeatable runout correction values in a disk drive, comprising:
    determining a position error signal due to repeatable runout at each of a plurality of points along a track addressed by a first transducer head;
    measuring a time domain impulse response of a disk drive servo control system associated with said first transducer head;
    transforming said time domain impulse response into an error transfer function;
    taking the reciprocal of said error transfer function;
    transforming said reciprocal error transfer function into an inverse impulse response; and
    convolving said inverse impulse response with said position error at each of a plurality of points along said track to obtain a runout correction value for each of said plurality of points.

2. The method of claim 1, wherein said step of transforming said time domain impulse response into an error transfer function is performed using a Discrete Fourier Transform.

3. The method of claim 1, wherein said step of transforming said reciprocal error transfer function into an inverse impulse is performed using an inverse Discrete Fourier Transform.

4. The method of claim 1, wherein an inverse impulse response is obtained for each transducer head included in said disk drive.

5. The method of claim 1, wherein said repeatable runout values are calculated for a selected plurality of tracks in said disk drive.

6. The method of claim 1, wherein said impulse response is measured for a plurality of zones on a disk.

7. The method of claim 1, further comprising storing said runout correction value for each of said plurality of points in a corresponding servo sector.

8. The method of claim 1, wherein said step of measuring a time domain impulse response of a disk drive servo control system comprises:
    providing a first positive runout correction value to said disk drive servo control system;
    measuring a time domain impulse response of said disk drive servo control system to said first positive runout correction value;
    providing a first negative runout correction value to said disk drive servo control system;
    measuring a time domain impulse response of said disk drive servo control system to said first negative runout correction value; and
    calculating an average time domain impulse response of said disk servo control system.

9. The method of claim 1, wherein said step of measuring a time domain impulse response of a disk drive servo control system comprises:
    writing a null runout correction value to all but a first hard sector;
    writing a first positive runout correction value to said first hard sector;
    measuring a time domain impulse response of said disk drive servo control system to said first positive runout correction value;
    writing a first negative runout correction value to said first hard sector;
    measuring a time domain impulse response of said disk drive servo control system to said first negative runout correction value;

writing a null runout correction value to all but an $n^{th}$ hard sector;

writing an $n^{th}$ positive runout correction value to said $n^{th}$ hard sector;

measuring a time domain impulse response of said disk drive servo control system to said $n^{th}$ positive runout correction value;

writing a first negative runout correction value to said $n^{th}$ hard sector;

measuring a time domain impulse response of said disk drive servo control system to said $n^{th}$ negative runout correction value;

circularly shifting said measured response to said $n^{th}$ positive and said $n^{th}$ negative runout correction value;

calculating an average time domain impulse response of said disk servo control system; and normalizing said average time domain impulse response.

10. The method of claim 9, wherein n is equal to a total number of hard sectors associated with said track.

11. The method of claim 9, wherein n is equal to a total number of hard sectors associated with said track, and wherein a response to a positive and a negative correction value is measured for each of said n hard sectors.

12. The method of claim 1, further comprising filtering said reciprocal error transfer function.

13. The method of claim 1, further comprising detrending said inverse impulse response.

14. A method of generating and using compensation values for a disk drive, comprising:

providing a data storage disk in the disk drive, the disk having at least a first track addressable by a first head, said at least a first track having an ideal shape and an actual written shape, and having a plurality of hard sectors;

determining a position error of said actual written shape of said at least a first track at each of said plurality of hard sectors associated with said at least a first track;

measuring a time domain impulse response of a servo control system associated with said first transducer head;

transforming said time domain impulse response to an error transfer function;

taking the reciprocal of said error transfer function;

transforming said reciprocal error transfer function to an inverse impulse response for said servo control system associated with said first transducer head;

convolving said inverse impulse response and said position error of said actual written shape of said track at each of said plurality of hard sectors associated with said track to obtain a repeatable runout correction value for each of said plurality of hard sectors; and writing said repeatable runout correction values to said plurality of hard sectors, wherein said embedded runout correction values cause said head to follow said ideal shape of said track.

15. The method of claim 14, wherein said step of measuring a time domain impulse response of a servo control system comprises:

writing an embedded runout correction signal having a value of zero to all of said plurality of hard sectors having an embedded runout correction signal not equal to zero;

writing an embedded runout correction signal having a value equal to X to a first of said hard sectors;

measuring an impulse response of said servo system to said embedded runout correction signal in said first hard sector having a value equal to X;

writing an embedded runout correction signal having a value equal to -X to said first hard sector;

measuring an impulse response of said servo system to said embedded runout correction signal in said first hard sector having a value equal to -X;

writing an embedded runout correction signal having a value of zero to said first hard sector;

writing an embedded runout correction signal having a value equal to X to a second hard sector;

measuring an impulse response of said servo control system to said embedded runout correction signal in said second hard sector having a value equal to X;

writing an embedded runout correction signal having a value equal to -X to said second hard sector;

measuring an impulse response of said servo control system to said embedded runout correction signal in said second hard sector having a value equal to -X;

calculating a sum of said measured impulse responses of said servo control system to said embedded runout correction signals having a value equal to X to obtain a first sum;

calculating a sum of said measured impulse responses of said disk drive head to said embedded runout correction signals having a value equal to -X to obtain a second sum;

inverting said second sum;

calculating a sum of said first and second sums to obtain a gross impulse response of said disk drive head;

dividing said gross impulse response by a total number of impulse response measurements to obtain an average disk drive impulse response; and dividing said average disk drive impulse response by X to obtain a normalized time domain representation for said disk drive head.

16. The method of claim 14, wherein X is equal to a +10% correction value, and wherein -X is equal to a -10% correction value.

17. The method of claim 14, wherein said measured time domain impulse response of said servo control system comprises a numerical model of said time domain impulse response of said servo control system.

18. The method of claim 14, wherein said step of determining a position error of said actual written shape of said at least a first track is repeated for each disk surface in said disk drive, and wherein said step of measuring a time domain impulse response of said servo control system is repeated for each head in said disk drive.

19. The method of claim 14, wherein said step of determining a position error of said actual written shape of at least a first track is repeated for a plurality of tracks on a disk surface.

20. The method of claim 14, further comprising filtering said error transfer function.

21. The method of claim 14, further comprising detrending said inverse impulse response.

22. A hard disk drive having embedded runout correction values determined from a numerical model of an impulse response of each of said hard disk drive's heads, comprising:

a base;

a disk comprising a plurality of data tracks arranged concentrically about said spindle, wherein each of said data tracks is segmented into a plurality of data sectors by servo sectors, wherein said disks may be rotated at a constant velocity with respect to said base, and wherein each of said tracks has an ideal shape and an actual written shape;

a transducer head for reading information from said data tracks and for writing information to said data tracks, wherein said transducer head is movable in a radial direction with respect to said disk to address a selected one of said plurality of data tracks;

a voice coil motor, interconnected to said transducer head, for moving said transducer head with respect to said data tracks;

a channel for receiving signals, including position error signals and embedded correction values, derived from said disk by said transducer head;

a controller, interconnected to said voice coil motor, for controlling a position of said transducer head with respect to said data tracks, wherein each of said servo sectors in at least a first track contains a plurality of embedded runout correction values, wherein said embedded runout correction values are calculated from the convolution of a numerical model of an impulse response describing the motion of said transducer head in response to an input with a position error of said at least a first track due to repeatable runout, wherein said numerical model is obtained by introducing an impulse function to said channel and measuring a response to obtain an impulse response, transforming said impulse response to a frequency domain response, taking the reciprocal of said frequency domain response, and inverse transforming said reciprocal frequency domain response.

23. The hard disk drive of claim 22, wherein said hard disk drive comprises a plurality of transducer heads and a plurality of disk surfaces, wherein each of said transducer heads addresses a corresponding disk surface, wherein a numerical model of an impulse response describing the motion of a transducer head is obtained for each of said plurality of transducer heads, and wherein at least a first track on each of said disk surfaces contains a plurality of embedded runout correction values.

24. The hard disk drive of claim 22, wherein said channel comprises a digital signal processor, and wherein said convolution of a numerical model of an impulse response describing a motion of said transducer head in response to an input with a position error of said at least a first track due to repeatable runout is performed using said digital signal processor.

25. The hard disk drive of claim 22, wherein said frequency domain response is filtered.

26. The hard disk drive of claim 22, wherein an inverse impulse response obtained by inverse transforming said reciprocal frequency domain response is detrended.

* * * * *